(12) United States Patent
Perkins et al.

(10) Patent No.: US 12,124,983 B2
(45) Date of Patent: Oct. 22, 2024

(54) AUTOMATED GUEST ACTIVITY DETECTION

(71) Applicant: LAS VEGAS SANDS CORP., Las Vegas, NV (US)

(72) Inventors: Matthew Perkins, Las Vegas, NV (US); Meg Russell, Las Vegas, NV (US); Yue Woon Hiang, Singapore (SG)

(73) Assignee: LAS VEGAS SANDS CORP., Las Vegas, NV (US)

( * ) Notice: Subject to any disclaimer, the term of this patent is extended or adjusted under 35 U.S.C. 154(b) by 287 days.

(21) Appl. No.: 17/463,029

(22) Filed: Aug. 31, 2021

(65) Prior Publication Data

US 2022/0114514 A1  Apr. 14, 2022

Related U.S. Application Data

(60) Provisional application No. 63/089,916, filed on Oct. 9, 2020.

(51) Int. Cl.
*G06Q 10/06* (2023.01)
*G06K 9/00* (2022.01)
(Continued)

(52) U.S. Cl.
CPC ......... *G06Q 10/0633* (2013.01); *G06Q 50/12* (2013.01); *G06V 40/172* (2022.01);
(Continued)

(58) Field of Classification Search
None
See application file for complete search history.

(56) References Cited

U.S. PATENT DOCUMENTS

| 2014/0136106 A1* | 5/2014 | Chakraborty | G06Q 50/28 |
| | | | 701/521 |
| 2015/0348049 A1* | 12/2015 | Todasco | G06Q 50/12 |
| | | | 705/14.1 |

(Continued)

OTHER PUBLICATIONS

International Search Report and Written Opinion dated Nov. 23, 2021 issued in corresponding PCT Application No. US/2021/048547, 12 pages.

(Continued)

*Primary Examiner* — Eric W Stamber
*Assistant Examiner* — Ashley Y Young
(74) *Attorney, Agent, or Firm* — Lewis Roca Rothgerber Christie LLP

(57) ABSTRACT

A system for predicting a particular intended action of a guest on a resort property is provided, the system including a server configured to connected to and to receive data from a mobile device of the guest or via camera images of the guest; a plurality of interaction devices, each of the interaction devices being configured to connect to the mobile device when the guest is within a particular distance of a respective interaction device and/or capture digital images of the guest, wherein the server is configured to obtain guest information from the respective interaction device; and a processor configured, based on the guest information, to make a prediction of the guest's intended action or destination; and to initiate a business workflow within the resort property based upon the prediction of that guest's intended action or destination.

22 Claims, 5 Drawing Sheets

(51) Int. Cl.
    *G06Q 10/0633*     (2023.01)
    *G06Q 50/12*     (2012.01)
    *G06V 40/16*     (2022.01)
    *H04B 17/318*     (2015.01)
    *H04W 4/02*     (2018.01)
    *H04W 4/30*     (2018.01)

(52) U.S. Cl.
    CPC .......... *H04B 17/318* (2015.01); *H04W 4/023* (2013.01); *H04W 4/30* (2018.02)

(56) References Cited

U.S. PATENT DOCUMENTS

| | | | |
|---|---|---|---|
| 2017/0163655 A1* | 6/2017 | Ramalingam | H04W 48/04 |
| 2018/0218460 A1* | 8/2018 | Boss | G07C 9/00904 |
| 2019/0332785 A1* | 10/2019 | AthuluruTlrumala | H04W 8/005 |

OTHER PUBLICATIONS

Canadian Examiner's Report for Application No. 3,194,335, mailed Aug. 6, 2024, 3 pages.

\* cited by examiner

System 100

Mobile Device 200

Server 300

System 1200

AUTOMATED GUEST ACTIVITY DETECTION

CROSS-REFERENCE TO RELATED APPLICATION

The present application claims priority to and the benefit of U.S. Provisional Application No. 63/089,916, filed Oct. 9, 2020, entitled "AUTOMATED GUEST ACTIVITY DETECTION", the entire content of which is incorporated herein by reference.

FIELD

One or more aspects of embodiments according to the present disclosure relate to systems and methods for detecting and predicting guest activity on a property such that business workflows can be initiated based on such predicted guest activity.

BACKGROUND

In properties designed to accommodate a number of guests, such as resorts and hotels, the timing of certain actions and operations performed by the property staff, designated as workflows, can not only improve the stay of a guest, but can improve the business operations and revenue of the property. Such actions or workflows, for example, may include personalized guest welcoming, room cleaning, check-in, check-out, among others. It will be appreciated that the more information that the property may have about the location or action and anticipated location or intended action of a particular guest the better the property can plan for business workflows to improve a guest experience at the property as well as to improve revenue for the property.

For example, one operational challenge faced by properties such as resorts is to have enough clean rooms ready for newly arriving guests given the short room-turn window that is bounded by when a guest checks-out and when the next guest checks-in. If a guest is not able to check-in at their allotted time, they may have a negative view of the property, which may result in the guest reducing the amount of money that they will spend on the property and reducing the likelihood that they will be loyal to the property brand and return in the future.

The above information disclosed in this Background section is only for enhancement of understanding of the background of the present disclosure, and therefore, it may contain information that does not form prior art.

SUMMARY

According to an embodiment of the invention, a system is provided for initiating a workflow on a resort property, the system including a plurality of interaction devices, each of the interaction devices being configured to wirelessly connect to a mobile computing device associated with respective guests of the resort property only when the mobile computing device is within a predetermined vicinity of at least one interaction device and/or being able to capture images of a guest of the resort property when the guest is within a predetermined vicinity of at least one interaction device; a server being configured to obtain guest information from the plurality of interaction devices, wherein the guest information comprises a signal strength of the mobile computing device that is connected to one or more interaction devices or images of the guest, as well as a time stamp associated with the signal strength or images; a processor and a non-transitory computer readable medium, the non-transitory computer readable medium having computer-executable instructions stored thereon which, when executed, cause the processor to: store the guest information on the server; evaluate the guest information relating to a particular guest of the resort property against historical information of other guests to determine whether the guest information of the particular guest allows the system to make an accurate prediction of the particular guest's intended action or destination based on the stored historical information; and if the guest information allows an accurate prediction to be made regarding a guest's intended action or destination, initiate a workflow based on the prediction.

In one embodiment, each of the interaction devices is a location device, an access point, a sensor, or a camera. Further, the guest information may include data relating to guest travel on a route between a first and a second interaction device.

In one embodiment, the prediction may be based on the stored historical information is based on a percentage of guests traveling on the route between the first and second interaction devices, may further be based on a percentage of guests traveling on the route between the first and second interaction devices during a predetermined period of the day, and may be further based on a percentage of guests traveling on the route between the first and second interaction devices on a date identified by the system as the particular guest's check-out date. Further, in one embodiment, when the prediction is higher than a predetermined threshold, the system may be configured initiate a workflow based on the prediction. For example, when the prediction related to guests traveling on the route between the two interaction devices during a predetermined period of a day is higher than 95%, the system is configured to initiate a workflow based on the prediction.

In one embodiment, the system is configured to compare the historical information with obtained guest information relating to the particular guest to predict the particular guest's intended action or location.

Further, a workflow initiated by the system may include at least one of the following activities of checking out a guest, checking in a guest, indicating that a guest room is ready to be serviced by housekeeping, notifying housekeeping that a guest room is ready to be serviced, issuing a key, retrieving a guest's vehicle, delivering a guest's luggage to their room, and setting a thermostat in a room to a particular temperature.

In one embodiment, one of the interaction devices is a door sensor configured to provide a door sensor notification to the system when a door associated with the door sensor is either opened or closed. For example, the prediction associated with the obtained information may include the door sensor notification from the door sensor associated with a respective door. In one embodiment, when the prediction includes information relating to the door sensor notification from the door sensor associated with a respective door such that the prediction of a particular intended action or location is higher than a predetermined threshold for a predetermined time period, the system is configured to initiate a workflow based on the prediction.

In one embodiment, a system is provided for automatically checking out a guest of a resort property, the system including: a plurality of interaction devices, each of the interaction devices configured to electronically obtain guest information from guests of the resort property; a server in electronic communication with the interaction devices and configured to electronically obtain the guest information from the plurality of interaction devices, wherein the guest information comprises a signal strength of the mobile computing device that is connected to one or more interaction devices or images of the guest as well as a time stamp associated with the signal strength or images; a processor and a non-transitory computer readable medium, the non-transitory computer readable medium having computer-executable instructions stored thereon which, when executed, cause the processor to: store the guest information on the server; evaluate the guest information relating to a particular guest of the resort property against historical information of other guests to determine whether the guest information of the particular guest allows the system to make an accurate prediction of the particular guest's intended action or location based on the stored historical information; determine, based on information stored in the server, whether a current date is the guest's intended check-out date; predict based on the historical information whether the likelihood that the guest intended to check out is higher than a predetermined threshold; if, upon predicting that the likelihood that the guest is checking out is higher than the predetermined threshold, automatically checking out the guest.

In one embodiment, each of the interaction devices is a location device, an access point, a camera, or a sensor. Further, in one embodiment, the instructions may cause the processor to determine whether the guest's computing device is connected to any of the interaction devices on the property or whether any of the interaction devices have communicated images of the guest to the system as part of predicting whether the guest is not planning to return to the property. Additionally, if the system has checked-out the guest, the instructions may cause the processor to further notify housekeeping staff of the resort that the guest's room is ready to be serviced.

In one embodiment, one of the interaction devices is a door sensor configured to provide a door sensor notification to the system when a door associated with the door sensor is either opened or closed. Further, the instructions may cause the processor to determine whether a door of the guest's room has been opened within a predetermined amount of time based on the door sensor notification to the system regarding the opening of that door.

In one embodiment, to evaluate whether the guest has traveled past the first interaction device, the system may evaluate whether the guest's mobile computing device has been recently connected to the first interaction device and whether the guest's mobile computing device was disconnected from the first interaction device after having been recently connected to it.

Further, in one embodiment, the prediction based on previous guests' behavior relating to traveling past the first interaction device comprises evaluating information obtained from a plurality of guests' mobile computing devices being connected to and disconnected from the first interaction device over a predetermined period of time.

Further, in one embodiment, automatically checking out the guest does not require any proactive action taken by the guest or by any staff of the property.

DETAILED DESCRIPTION

Figure 1:
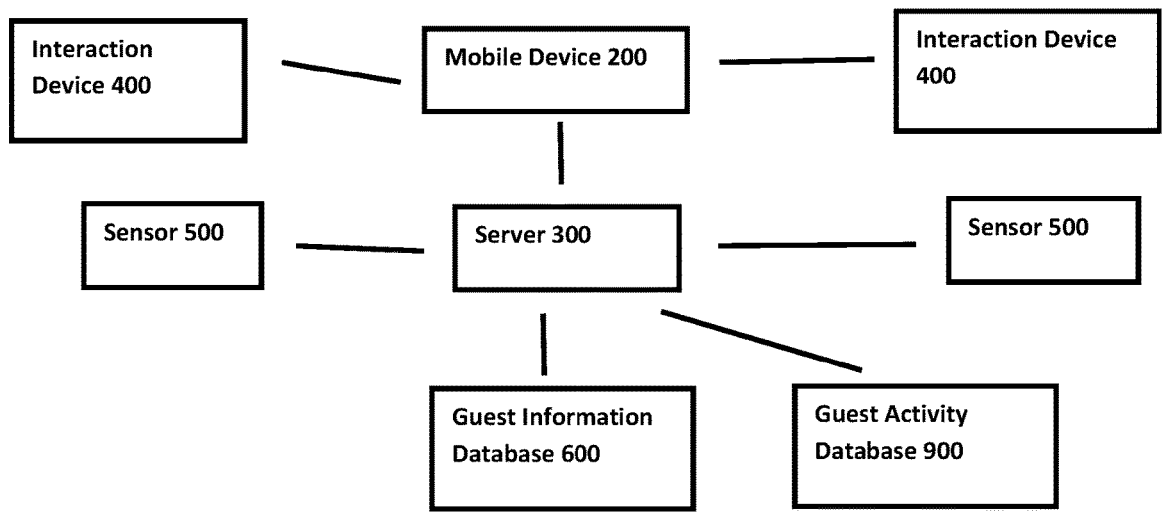
FIG. 1 is a block diagram showing an automated system 100 according to an exemplary embodiment of the present invention.

Exemplary embodiments of the present invention will be described in detail below with reference to the drawings.

In general, an automated system is provided for obtaining information, including location and identification information, relating to guests of a property, such as a hotel, resort, or another type of property intended to serve a number of guests, and for determining the likelihood that the guest is taking a particular action, such as checking-out, based on the obtained information, or is going to a particular location, such as their room, a restaurant, or the pool. Further, if the system predicts with reasonable certainty that the guest is taking a particular action or going to a particular location, the system may be configured to initiate business workflows to occur as a result of the predicted guest action or predicted destination. Because of the workflow efficiencies and other benefits provided by the predictive system, the guest experience at the property can be optimized in many ways including shorter waiting times, faster service, fewer necessary actions, and generally a more streamlined stay.

For example, in the case of the system predicting that a guest is checking out, the system could notify housekeeping services that the checked-out guest's room should be cleaned for the next guest, could notify valet services to have the guest's vehicle ready, could offer the guest a discount coupon to return to the property, and the like. It will be appreciated that the system could predict and initiate business workflows related a number of guest actions in addition to checking-out, such as checking-in, use of dining or other food and beverage services, use of gym and spa services, use of casino services, use of valet and luggage services, use of transportation services, use of convention services, use of cleaning services, use of bell services, use of building management services, use of entertainment services, use of social media services, and use of product delivery services.

As described in more detail below, the system may use machine learning to be able to accurately predict guest intended actions or intended destinations and thereby effectively initiate business workflows as a result of learned behaviors or tendencies.

In general, the system is configured to identify a location of a particular guest and to obtain information related to the guest's movements while the guest is on the property.

In one embodiment, the system may obtain information about a guest's movements while the guest is connected to a network on the property via the guest's mobile device, i.e., any device that the guest can attach to or carry on their person that can be connected to the property's network. In yet another embodiment, the system may obtain information about a guest's movements via cameras distributed throughout the property, the cameras being in electronic communication with the system.

In embodiments, the system is configured to track the movement of the guest throughout the property and is configured to predict the likelihood of a guest taking a particular action, such as, for example, checking-out and checking-in, using a particular service or amenity of the property, or ending up at a particular destination such as the guest's room, a property restaurant, or a property pool, based on the tracking of such movement of the particular guest and based on historical data obtained from many other guests over time, as well as other information received by the system.

In another embodiment, the system is configured to identify interactions, for example, via cameras or between a guest's mobile device and other electronic devices, both mobile and stationary, with which the guest's mobile device is capable of identifying, communicating, and interacting, and based on the identification of such interactions, initiate a business workflow or take other action as described in more detail below. As used herein a guest's interaction may be, for example, a guest ordering a cocktail via their mobile device at a bar located on the property, a guest using a facial recognition camera to obtain access to the gym, a guest walking past an interaction device located in a hallway while their mobile device is turned on, and the like.

The system may use machine learning to "learn" about guest activity and to make predictions based on such learning. Particularly, the system may use the large amount of data it acquires over time to find patterns in guest activity such that the system can accurately predict future guest actions or destinations based on those patterns.

As guests walk or otherwise travel around the property, they will "encounter" interaction devices as they walk or travel past them, wherein the interaction device can capture information about such guest movement and communicate such information to the system. Over time, the system will obtain a large amount of data from the interaction devices regarding guest movement around the property, including which interaction devices guests pass by, at what time, and on which date, and the like.

Further, the system will obtain the sequence in which guests pass by each interaction device, thereby allowing the system to create a virtual map of guest activity and guest movement within the property as will be described in more detail below. The system may be configured to look for and identify patterns among the guest movement data such that, if certain patterns occur with a threshold frequency, the system can be relatively certain of the intended action or intended destination of a guest that falls into the same pattern.

For example, the system may obtain data that a guest is walking past an interaction device that is located in a particular hallway of a floor of the resort. The system may then assess, as it can for every guest traveling past every interaction device, whether the system can make a prediction about the guest's intended action or intended destination based on the guest's encounter with that interaction device, and thereby initiate a workflow based on its prediction if the system believes its prediction to be accurate. If the system determines that it cannot make a reasonably accurate prediction for a particular guest traveling past a particular interaction device, then the system may take no action.

In one embodiment, the system may be configured to make a prediction based on historical data provided by previous guests traveling by the interaction devices on the property over time. As will be appreciated, when a particular guest travels past a particular interaction device in a particular direction, the system can assess the number of times other guests have traveled past this particular interaction device in this particular direction.

While information from one interaction device alone may not include enough data for the system to predict a guest action or destination, the system may be configured to then "look backwards" to determine the previous interaction device that the guest traveled past and assess how many guests have traveled past the previous interaction device on their way to the current interaction device. While this information alone also may not include enough data for the system to predict a guest action or destination, as will be apparent, the system could continue "looking backwards" to assess a number of the previous interaction devices the guest may have travelled past and could continue to compare that route with data the system has acquired from other guests who have travelled the same route. As such, the system could evaluate all or a portion of the previous interaction devices with which the guest had encountered and compare such "route" with data relating to other guests taking the same route to determine whether such route could lead to a prediction of the guest's intended action or destination.

For example, the system may receive information that a guest is walking past a number of interaction devices that are located along a particular hallway of the property which ends at a "T-stop", wherein the left hallway leads only to a restaurant and the right hallway leads only to a casino. While the guest is traveling down the first hallway, the historical data in the system may not provide enough data for the system to initiate any business workflows based on the guests traveling down this hallway.

However, based on historical data, the system may be able to determine that guests who turn left at the end of the hallway and proceed past an interaction device in the left hallway are highly likely to enter the restaurant and order food or drink and that guests who turn right at the end of the hallway and proceed past an interaction device in the right hallway are highly likely to enter the casino. Accordingly, while no workflows may be able to be initiated based on historical data when the guest is walking down the first hallway, when the guest walks past the left hallway interaction device, the system may initiate a workflow of offering an option to view the restaurant menu and to order food or drink without the guest taking any proactive action, based on information about the historical behavior of previous guests which the system has obtained. Similarly, when the guest walks past the right hallway interaction device, the system may initiate a workflow of offering a wagering promotion or a reduced entry into a gambling tournament without the guest taking any proactive action, also based on information about the historical behavior of previous guests which the system has obtained.

It will be appreciated that the system can be configured to initiate a workflow based on its prediction that it is highly likely for a guest to take a certain action or end up in a particular destination and that the prediction can be based on varying thresholds of the likeliness of a particular action to occur or a destination to be reached. For example, the workflow initiation may be based on a prediction that the event may occur at least 80% (or even less) of the time, 90% of the time, or even 99% of the time.

As will be appreciated, the threshold may vary for different predictions depending on, for example, the consequences of initiating a workflow when in fact the prediction is incorrect. For example, the system's prediction that a guest will be dining at a particular restaurant and therefore that the system will initiate a workflow of offering the guest the restaurant's menu may have a lower threshold than the system's prediction that a guest has checked-out of their room and therefore that the system will notify the staff to clean the room and prepare it for the next guest, the second scenario clearly having higher negative consequences if the system's prediction is incorrect.

In one embodiment, the system may obtain information from a guest information database, as described in more detail below, that a particular guest is due to arrive at the property on that particular day to check-in to their room. The system may obtain further information from the guest information database, for example, the approximate arrival time of the guest's flight and, in fact, the system may obtain the exact time that the guest's plane has landed and/or whether the arrival time is on-time or delayed. Based on at least such flight arrival information, the system may be able to estimate a guest's arrival time to the property. Of course, if the guest logs onto a mobile device application or if the system is able to otherwise know the guest's location, the system could have a higher confidence and could predict the guest's arrival time with greater precision.

In addition to having obtained information about a guest's arrival time, the guest may have signed into an app associated with the system and may thereby have uploaded an image of their identity into the app. Accordingly, the system may be configured to identify the guest by the digitally-stored image of themselves and may be able match the stored guest identity to the guest when the guest encounters a first interaction device on the property. In one embodiment, because the system is aware that the particular guest is due to check in to the property that day and may also be aware of the guest's expected airport arrival time, the system may be configured to "keep an eye out" for information from this particular guest.

In one embodiment, interaction devices as described in more detail below are dispersed around a property and can be used to determine a guest's location and direction of travel, such as by electronically connecting their mobile phone or by capturing digital images of a guest. In some cases, an interaction device may be located near each of potentially numerous entrances/exits to a property, or otherwise at a location that would be encountered by a guest arriving at the property for the first time to check in. When the guest encounters a first interaction device via their phone being connected or via their image being captured, the system can identify that the particular guest has reached the property and may be able to predict that the guest would like to check in to their room.

In some embodiments, the fact that the guest has arrived at the property on the date they are due to check in may be enough information for the system to initiate workflows associated with checking in without the guest having to take any action or having to wait in a line. For example, the system may be able to evaluate which rooms are clean and available for the guest to stay in for their entire trip, Further, the system may be able to automatically check-in the guest to their room and to automatically generate making and issuing to the guest a key to that room that the guest may pick up when they enter the property. Alternatively, the system may be able to configured to automatically provide an entry code or another type of electronic key such that the guest can enter their room using their phone or information on their phone without needing a physical key.

In yet another example, the system may receive information that the guest is walking down a hallway that leads to an elevator. The system may be able to determine that a certain percentage of guests who walk down that hallway indeed get into the elevator. If the guest does board the elevator, the system may be able display customized or personalized messages to the guest as they ride in the elevator, taking into consideration that there may be multiple guests in the elevator. The system may then receive information that the guest has requested access to a certain floor and has arrived at that floor, for example, via information provided by an interaction device located in the hallway of that floor.

Based on access to a guest information database, as described in more detail below, the system may know the specific room in which the guest is staying. Accordingly, the system may assess that the interaction device that the guest is travelling past is on the same floor as the guest's room. The system may know from historical data that guests who arrive on the floor of their room are likely going to their room. As such, upon detecting the guest on the floor of their room, the system can initiate workflows, for example, automatically turning on the lights in the guest's room as well as turning on the climate control in the room, among other workflows. As will be appreciated, in general, the system can initiate workflows based on comparing a guest's interaction with various interaction devices to historical data of previous guests' encounters with the same interaction devices and predicting a guest's intended action or location based on that information.

FIG. 1 is a block diagram showing an automated system 100 according to an exemplary embodiment of the present invention.

The automated system 100 according to an exemplary embodiment may include a mobile device 200 and a server 300.

In embodiments, the system 100 will take into account information relayed by a number of inputs as described in more detail below and may include a processor or a processing circuit configured to analyze such information to predict a guest's intended action and/or to initiate a business workflow. For example, the system 100 may include a number of interaction devices 400, which also include location devices, access points, sensors 500, and cameras 1000 which can provide information to the system 100. For convenience, as used herein, an interaction device 400 will be understood to mean any interaction device, location device, sensor, camera, or any other device capable of electronically interacting with a guest's mobile device.

As used herein, a location device is any device that is capable of identifying a location of another device or object, such as a mobile phone or a person, and is capable of relaying that information to the system 100. In one embodiment, the location device may use a global positioning system (GPS) to obtain the location of the mobile phone. In another embodiment, the location device may be a camera.

As used herein, an access point is any device capable of connecting directly to a broadband router or network switch, such as with an Ethernet or data cable. This provides the access point with the internet connection and bandwidth required and allows the access point to then transmit and receive a wireless signal which allows a wireless connection to a Local Area Network (LAN) and the internet.

As used herein, a sensor is any device that converts stimuli such as heat, light, sound, and motion into electrical signals. These signals are passed through an interface that converts them into a code, such as binary code, and passes the code on to a computer to be processed.

Further, it will be appreciated that any interaction device 400 can communicate by emitting and/or being able to receive a Wi-fi signal, a Bluetooth Low Energy (BLE) signal, a Near Field Communication (NFC) signal, a ZigBee signal, an infrared signal, a GPS signal, a radio signal, or other similar signals. Any interaction device may also be a camera capable of capturing images of guests' faces and their movements as the guest approaches and passes by the camera as well as a facial recognition reader capable of identifying a guest by their appearance.

Based on the information received by the system 100 from, for example, an interaction device 400, the system will be able to determine the likelihood of the guest taking a certain action or ending up in a certain destination. In one embodiment, if the system 100 determines that the likelihood of the guest taking the particular action or arriving at a particular destination exceeds a particular threshold as determined by the system, the threshold being based on historical data relating to similar actions taken by guests over a period of time, such that the system 100 is relatively certain (i.e., such that the system can predict with a high probability) that the action is occurring or will occur, the system 100 could initiate a business workflow for the property or take some other action in response to the particular predicted action taken or to be taken by the guest. For example, by initiating a particular workflow, such workflow initiation can improve the property staff's workflow efficiency while at the same time improving the particular guest's as well as other guests' experience on the property.

In one embodiment, the system 100 is configured to connect to and receive input from a guest's wireless electronic device 200 such as a mobile phone, personal digital assistant, or any other device carried by or otherwise accompanying the guest's movements and location. More particularly, the system 100 may be configured to be able to detect a signal emitted by a device associated with a guest, such signal being, for example, a wi-fi signal, a Bluetooth Low Energy (BLE) signal, a Near Field Communication (NFC) signal, a ZigBee signal, an infrared signal, a GPS signal, a radio signal, or other similar signals.

In embodiments, the system 100 can communicate with the guest's mobile device 200 such that data and information can be transferred therebetween. By the system 100 connecting to a guest's mobile device 200 or by the guest's mobile device connecting to the system 100, the system 100 can receive information about a guest, such as their location and/or property amenities or services with which they are interacting, based on the guest's mobile device communicating with, for example interaction devices, location devices, access points, or sensors that are spaced throughout the property, such devices being able to be connected to and to communicate with a user's mobile device 200 when the guest is within a certain range of one or more interaction devices.

In embodiments, a connection may be made between an interaction device 400 via, for example, a wi-fi signal, a Bluetooth Low Energy (BLE) signal, a Near Field Communication (NFC) signal, a ZigBee signal, an infrared signal, a GPS signal, a radio signal, or other similar signals. Additionally, the guest's mobile device 200 may be able to transmit information, for example, about an interaction device's signal intensity, location, or other information to the server 200 so that such information can be processed by the system 100.

Figure 9:
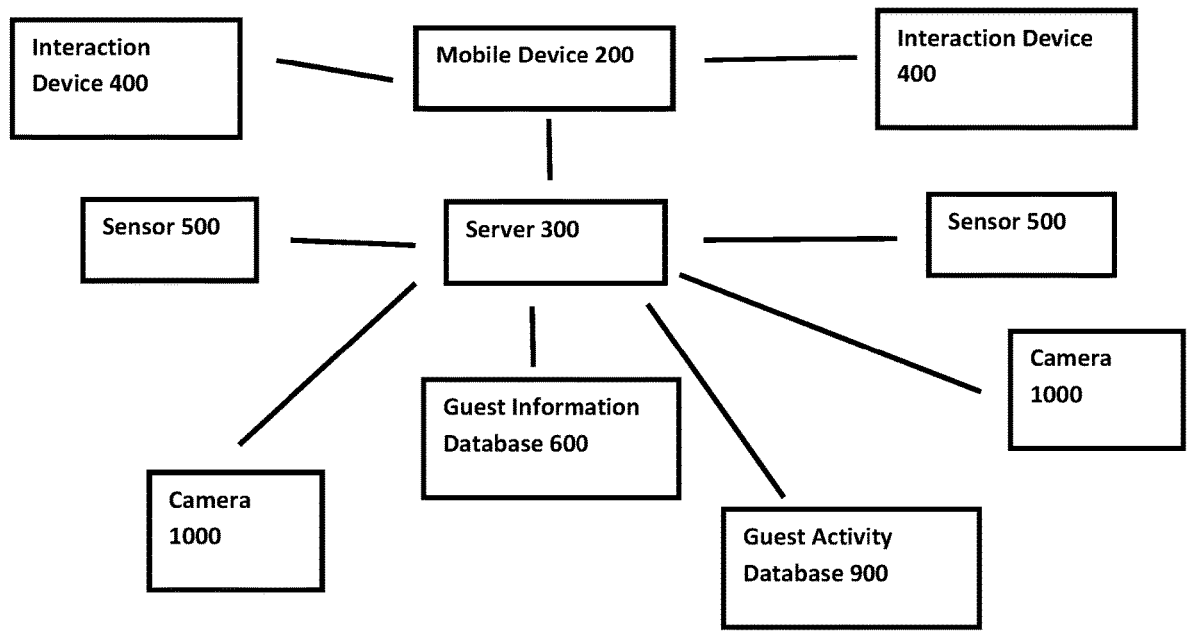
FIG. 9 is a block diagram showing an automated system 1200 according to an exemplary embodiment of the present invention.

With reference to FIG. 9, in another embodiment the system 1200 is configured to connect to and receive input from a camera 1000 as well as from other interaction devices 400 that may obtain information via a connection to a guest's mobile device 200. Particularly, the camera 1000 may be configured to digitally capture guest images as they approach and pass by each camera. The guest's identity can be confirmed by, for example, comparing a digital image of the guest obtained from the camera 1000 against images in the guest information database 600 to find a match. Additionally, the location of the guest at particular times can be confirmed using images obtained from the camera 1000. It will be appreciated that information from cameras 1000 may be used in connection with mobile phone information to corroborate information from one against the other.

Further, because certain interaction devices 400 are configured to only be connected to a guest's mobile device 200 when the guest is within a particular distance from such interaction device and because certain interaction devices will become disconnected from such guest's mobile device 200 when the guest moves farther away from the device than a threshold distance, the system 100 can track a guest's movement and/or interactions throughout the property based on such connections and disconnections to the interaction devices. Similarly, a camera 1000 may be mobile or stationary, but still may only be able to track a guest within a limited scope of vision as the guest travels past the camera. Therefore, the system may be configured to make educated assumptions as to where the guest may be going and as to what the guest may be doing.

As described in more detail below, in one embodiment, the system 100 can determine a guest's location to a relatively close approximation and can track that location as the guest moves from location to location on the property or outside the property and can thereby use that information among other inputs to determine the likelihood of a guest's intended actions. Additionally, the system 100 may be configured to predict a guest's next interaction with the property based on information received from the interaction devices 400 and also based on a guest's interaction with various interaction devices relating to the property.

In one embodiment, the system 100 includes a number of interaction devices 400 that are distributed around the property. Such interaction devices 400 may be configured to emit electronic signals in order to communicate with a guest's mobile device 200, wherein the guest's mobile device 200 is configured to communicate information obtained from the interaction devices 400 to the server 200. Alternatively, such interaction devices 400 may be configured to capture images of a guest, wherein the system could identify the guest via these images and communicate that information to the server 200. Further, it will be appreciated that any interaction device 400 may also be able to communicate with the system 100.

In one embodiment, the property interaction devices 400 may be configured to automatically establish a connection with a guest's mobile device 200 when the guest's mobile device 200 (and therefore, the guest themself) is within a particular proximity to the interaction device and when the guest's mobile device 200 has its ability to communicate with wireless signals turned on. In one embodiment, each interaction device will be able to communicate with a guest's mobile device 200 and establish a unique label, name, or other identifying nomenclature associated with that guest's mobile device 200 such that information collected from the guest's mobile device 200 by the interaction device 400 can be associated with such device. It will be appreciated that in another embodiment, the guest's mobile device could identify a particular interaction device 400 by a unique label, name, or identifying nomenclature and could communicate with a sever of the system 100 via Wifi, a cellular network, or other communication system.

Further, interaction devices 400 could be configured to communicate with a guest's mobile device via a Wi-fi signal, a Bluetooth Low Energy (BLE) signal, a Near Field Communication (NFC) signal, a ZigBee signal, an infrared signal, a GPS signal, a radio signal, or other similar signals. For example, a guest may order room service from a room service interaction device via an application on the guest's mobile device 200 while the guest is walking to their room. Accordingly, the system 100 may be configured to notify a room service staffer to deliver the guest's food once the system has identified that the guest is in their room or is close to their room. Further, the system 100 may associate that particular food order with that guest and may later offer the guest a discount coupon for the same or similar food item based on information obtained via the food ordering interaction device.

Additionally, in another embodiment, when cameras 1000 are used as the interaction devices, the system may be able to visually determine the guest's identification from their face and the direction in which the guest is traveling based on their movement. It will be apparent that the system may use a combination of interaction devices 400 that obtain information by connecting to a guest's phone as well as camera that obtain information visually.

In one embodiment, the server 300 may be configured to continuously store and keep track of a guest's previous locations and interactions, including the sequence of locations and interactions by the guest, in a guest activity database 900 as the guest traverses the property in order to be able to predict the guest's future locations and interactions, and may be configured to update the prediction in the database as the guest moves or has further interactions. Accordingly, the system 100 is configured to use this historical data it acquires from guests' mobile devices or from its cameras to improve its ability to predict a guest's future location, destination, or interaction based on the history of previous guests and their behavior patterns as well as based on any particular guest's prior locations and interactions and the particular guest's behavior patterns.

In one example, the system 100 may receive data from a number of guests' mobile devices that are interacting with interaction devices on the property as the guests move throughout the property and store such information in the guest activity database. As will be appreciated, such data could be collected over a period of time, such as hours, days, months, or years. Further, having acquired a large amount of data relating to guest activity, the system 100 is configured to evaluate the data, particularly by comparing data the system receives from a particular guest against the historical data the system has accumulated to determine whether an accurate contemporaneous prediction can be made regarding that guest's intended action or destination.

In this example, the system 100 may be able to determine, based on examining the guest data collected, that particular guests are in their assigned rooms on the morning of the date on which such guests are due to check-out. The system 100 may be configured to access a guest information database 600 as described below that provides to the system each guest's room number and check-out date. Further, the system 100 may be able to determine based on historical door sensor data stored in the guest activity database 900 that guests usually leave their room before 11:00 am on the date of their intended check-out, and wherein the system understands 11:00 am to be the check-out time based on the guest information database 600 or another information database with which the system may be able to access.

Once the system 100 determines that any particular guest leaves their room before 11:00 am on that guest's check-out day, the system may be able to track the guest's location and interactions within the property based on data provided to the system by that guest's mobile device 200 as result of that guest's mobile device interacting with various interaction devices 400 or by cameras visually tracking the guest as the guest moves within the property.

For example, over time and based on historical data, the system 100 may be able to determine that a certain percentage of guests who leave their room by 11:00 am on their check-out date interact with interaction devices that are located near to or are otherwise related to a valet stand located on the property, such as a valet stand application that allows the user to summon their vehicle from the mobile device 200. Further, the system 100 may be determine via the historical data that a certain percentage of guests who interact with the valet stand interaction devices on their check-out day do not return to their rooms after such interactions.

Accordingly, based on such information, the system 100 may then be able to predict that when a guest leaves their room before 11:00 am on their check-out day and interacts with the valet stand interaction devices, the guest's intention is to check-out and not return to their room. As such, if the system determines that a particular guest has checked out of their room before the check-out time on their check-out date and has interacted with the valet stand and compares that data with historical data in the guest activity database 900 that indicates that the guest will most likely not return to their room, the system 100 can be configured to automatically check-out that particular guest after the guest's interaction with the valet stand interaction device. Further, the system 100 may be able to provide business workflow instructions to a housekeeping service that such particular guest's room can now be serviced even if the guest has not taken any proactive steps to "check-out" of their room, such as physically informing a staff member at the front desk that they are checking out or by indicating their intention to check-out via their mobile device or via an amenity in the room. Accordingly, the system may be configured to check-out a guest and initiate a business workflow based on data and information passively received via a guest's mobile device and/or via the interaction devices without the guest having taken any proactive steps to check-out. It will be appreciated that this check-out example is merely one example of many actions that the system 100 may be able to take based on information and data received from the interaction between a guest's mobile device and interaction devices on the property.

Figure 2:
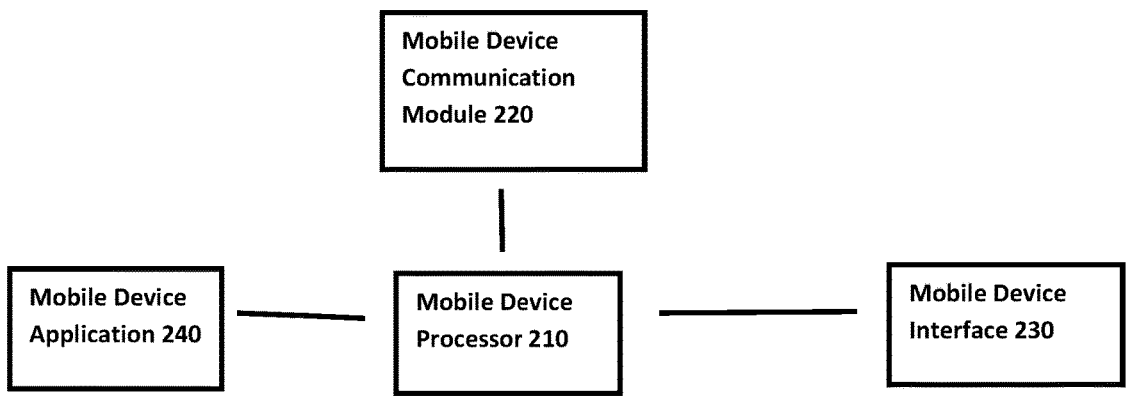
FIG. 2 is a block diagram of the mobile device 200 of FIG. 1.

FIG. 2 is a block diagram of the mobile device 200 of FIG. 1.

Referring to FIG. 2, the mobile device according to an exemplary embodiment may include a mobile device processor 210, a mobile device communication module 220, a mobile device memory 230, a mobile device interface 240, and a mobile device application 250.

In one embodiment, the mobile device 200 may be configured to measure a signal intensity of another device producing a signal, or to otherwise sense another device, such as another mobile device, interaction devices 400, or a sensor 500 via its mobile device communication module 220 and transmit such information to the server 300.

Based on data received from, for example, the guest's mobile device 200, the server 300 may be configured to track a guest's location or interactions by using WiFi or by another communication signal to keep track of not only the guest's current location or interaction, but also the guest's previous locations and interactions. In one embodiment, the server 300 may store each guests' locations and interactions and the time of the locations and interactions in real-time in the guest activity database 900. Accordingly, the system will be able to keep track of each guest's locations and interactions during their stay at a property and the system will thereby be configured to recognize common patterns in guest behavior among guests. Based on such pattern recognition of previous guests' actions, the system 100 may be configured to predict a particular guest's future activity, interaction, or destination.

The mobile device 200 may further include a mobile device interface 230 which may serve as an interface between the mobile device 200 and external devices connected to the mobile device. The mobile device interface 230, for example, may include a port to connect a device having an identification module, a data port, a memory card port, a charger port, and the like.

In one embodiment, the identification module is configured to store various information including, for example, an authentication module and may be in the form of a chip. Accordingly, when the guest's mobile device 200 communicates with the server 300, the server may be able to uniquely identify the guest's mobile device via information obtained from the identification module.

In one embodiment, the mobile device 200 may include a mobile device processor or processing circuit 210 which may be configured to receive information measured from the mobile device communication module 220 regarding, for example, an interaction device 400 signal intensity or a sensor 500 intensity. In one embodiment, the mobile device processor 210 may be configured to map information based on a combination of interaction device signal intensities and a time stamp to create a history of the guest's locations. Similarly, in one embodiment, the mobile device processor 210 may be configured to keep track of a combination of a guest's interactions and a time stamp to create a history of guest interactions.

Further, the mobile device 200 may include an application 240 that may be downloaded by the guest onto their mobile device such that the guest can provide information to the system 100 as well as receive information from the system. In embodiments, a guest may use the application 240 to perform various interactions within the property such as ordering food and drink in a restaurant or via room service, redeeming coupons, assigning digital keys to other guests, summoning a staff member, checking-in to a night club, and the like.

In one embodiment, the application 240 may allow a guest to upload a photograph of themself to be stored in a guest information database 600. As such, the system 100 may use the stored photograph of the guest to identify the guest and provide customized offerings or service to the guest or to allow the guest to use their identity as a key to gain access to various amenities reserved for guests, such as the gym, the pool, certain areas of the property, to allow the system to associate a guest with a payment obligation and charge the guest for the payment obligation, to notify the valet staff to retrieve a guest's car, and the like. Further, the system 100 may use the guest's photograph to identify the guest as they travel around the property rather than, or in addition to, the information obtained by the system from the guest's mobile device and to initiate various workflows as described herein.

Figure 3:
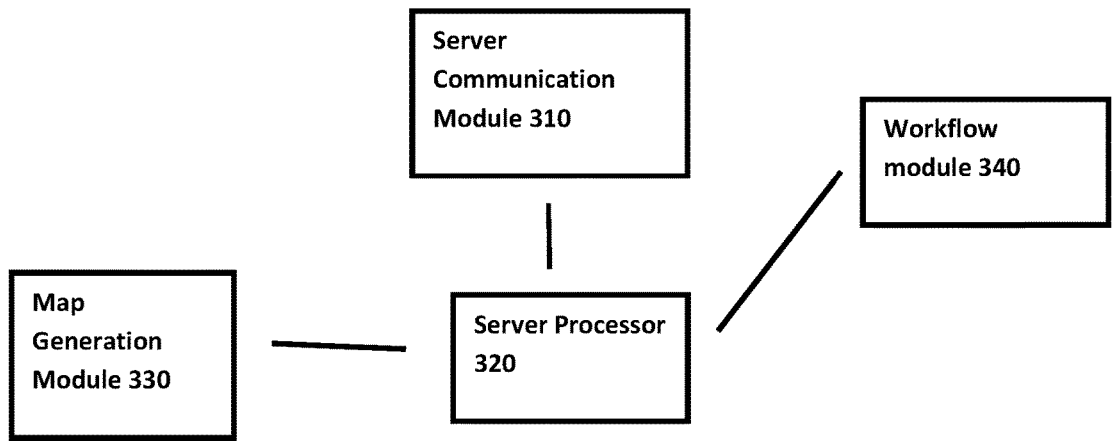
FIG. 3 is a block diagram of the server 300 shown in FIG. 1.

FIG. 3 is a block diagram of the server 300 shown in FIG. 1.

Referring to FIG. 3 as well as FIG. 1, the server 300 according to an exemplary embodiment may be configured to track a location of a guest or interactions of a guest with property amenities via the guest's mobile device 200 using, for example, the signal intensity information and visual information sent to the server from a number of interaction devices 400, sensor information from a number of sensors 500, and interactions between the guest's mobile device and various interaction devices. In one embodiment, the server may store a record of a guest's location and interactions in a guest activity database 900.

In one embodiment, the server 300 may include a server communication module 310, a server processor 320, and a map generation module 330.

In one embodiment, the server communication module 310 may be configured via wireless communication to receive interaction device signal intensities from the guest's mobile device 200 as well as sensor information from various sensors 500 located throughout a property. Additionally, the server communication module may transfer such interaction device signal intensities to the server processor 320 such that the server can store and analyze such data.

In one embodiment, the server communication module may be configured to receive interaction information about interaction device activity via a guest's mobile device 200 or via the interaction device 400 directly.

In another embodiment, the guest's mobile device 200 may be configured to receive via wireless communication interaction device signal intensities from the interaction device 400 and communicate data from such interaction devices to the server 300 via the server communication module 310.

Further, in one embodiment, the server processor 320 may be configured via the map generation module 330 to generate a map using, for example, signal intensities and interaction activity from various interaction devices 400 received from the guest's mobile device 200 as well as sensor information received from various sensors 500. In one embodiment, an accelerometer or gyroscope may be used to estimate a trajectory of the guest's mobile device 200 as the guest travels through the property. Particularly, based on accelerometer or gyroscope data as well as interaction device data, the system may be configured to continuously keep track of a guest's speed and general direction. Over time, as guest mobile devices show similar paths, the map generated by the map generation module would show the most common trajectories and would allow the system to rely more heavily on the map and to make more accurate predictions of guest activity and behavior based on the map.

In one embodiment, by monitoring the communication between guest devices and interaction devices, the system 100 can identify a guest's location with a reasonable degree of certainty. In one embodiment, the map generation module 330 on the sever 300 can use information from the interaction devices 400 to use a dead reckoning process or triangulation from a plurality of interaction devices to determine a guest's location. In one embodiment, the system 100 may be able to use the signal strength from three interaction devices which the guest is near to determine a guest's location via their mobile device 200. For example, if the system 100 detects that the signal strength from three interaction devices 400 is the same from each interaction device, it may determine that the guest is located an equal distance from each interaction device. If the guest then moves in a particular direction, the system 100 may detect that that the signal strength from one of the interaction devices 400 is stronger than the signal strength from the other two interaction devices and may determine that the guest has moved toward the first interaction device and away from the other two interaction devices.

In one embodiment, by continuously identifying the signal strengths and the establishing and disestablishing of connections between the guest's mobile device 200 and various interaction devices 400, the system 100 may be able to determine the direction in which the guest is moving and the approximate speed at which the guest is moving, and thereby may also be able to predict a guest's destination based on such information, particularly in combination with other information obtained by the system 100 as described herein and based on historical information obtained about previous guests.

Further, the system may use information obtained from cameras 1000 as interaction devices 400 to obtain information about a guest's location and traveling direction. Particularly, a camera 1000 may be used to capture images of a guest as the guest travels throughout the property and may be able to transmit those images to the system which can store the images and/or use the images to continuously add to the map being generated by the guest data. It will be appreciated that via the network of cameras 1000 throughout the property, the system 100 would be able to evaluate a guest's approximate location and traveling direction similarly to obtaining data from the guest's mobile phone.

Further, in one embodiment, the server 300 may include a workflow module 340 which is configured to store a number of workflow initiation instructions and information and to send a notification to designated staff members that a particular workflow may be initiated as determined by the system 100. For example, if the system 100 makes a determination that a particular guest has left their room with the intention of checking-out (or with the intention of not returning to that room on this trip), the server 300 may use the workflow module 340 to send a notification to one or more staff members that the formerly occupied room may now be serviced because the guest has checked-out. Accordingly, because the system 100 is able to determine that the guest has checked-out, the initiation and notification to the staff regarding the servicing of the room can occur sooner than relying on a guest to proactively indicated their checking-out of the room.

In other embodiments, the notification module 340 may include notifications to staff members to prioritize certain work, to provide safety notifications to staff members, and to provide information about guests to the staff, such as guests' names and any other information that may allow the staff to provide a better and more pleasant experience to guests. Additionally, the notification module may be used to send notifications to guests, including, for example, extending offers, providing warnings, identifying points of interest that match their preferences.

In one embodiment, the system 100 is configured to also receive input from door sensors 702, 704, 706 (see FIG. 4) that are incorporated into room doors, hallway doors, and other relevant doors on the property. Particularly, each door sensor 702, 704, 706 may be connected to and configured to communicate with server 300 such that the door sensor can provide information obtained by use of the door with which it is associated to the system 100. In another embodiment, the door sensor may be able to connect to and to communicate with a guest's mobile device 200 which in turn can communicate with the system 100.

In one embodiment, each door sensor 702, 704, 706 can provide information related to, for example, when the door is opened or closed and when the door is locked or unlocked. Further, each door sensor 702, 704, 706 may be able to indicate to the server whether the door is locked from the outside or inside a room. Additionally, each door sensor 702, 704, 706 may be able to provide information relating a digital key that is being used to operate the door and therefore, the system 100 may be able to determine whether a particular guest is operating the door or whether a particular staff member is operating the door, based on to whom the digital key is assigned.

Over time, the system will accumulate data from the door sensors relating to the opening and closing of guest room doors on the property and, in addition to other information the system 100 may have relating to guest behavior, the system is configured to look for and identify patterns in such data that could help the system make predictions about a guest's intended action or destination when that guest's behavior follows a recognized pattern.

Accordingly, the system 100 can predict, depending on certain situations, the likelihood that a guest has entered or left a room and if they intend to return, or that housekeeping services staff or other property staff may have entered or left a room. The system may be able to make this determination even if there not a further interaction device or sensor in the room itself that confirms whether one or more people are in the room or whether it may empty.

It will be appreciated that the rooms may also include sensors to detect various other characteristics, such as motion, weight, heat, capacitance, resistance, distance, height, and the like.

Figure 4:
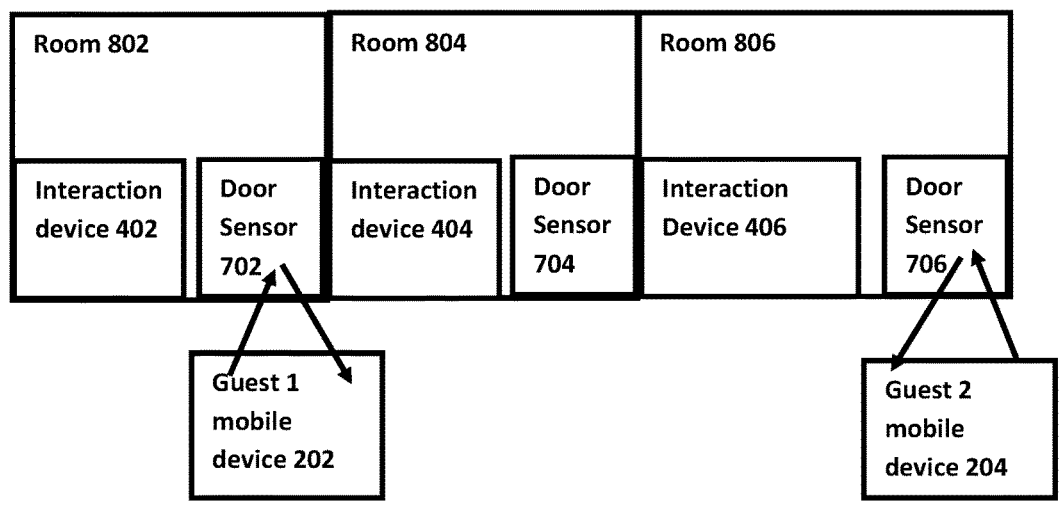
FIG. 4 is a schematic diagram of an exemplary guest entry and exit of a room having a door sensor and an interaction device according to an embodiment of the present invention.

With reference now to FIGS. 4 to 7, another exemplary embodiment of the automated guest activity detection system 100 will be described. FIG. 4 depicts three rooms 802, 804, 806 located on a particular property, each room having a door equipped with the door sensor 702, 704, 706 as described above, the doors sensors being configured to communicate with the server 300 or a guest's mobile device 200 to providing opening/closing and locking/unlocking information to the server or mobile device. Additionally, each room is located proximate to at least one interaction device 402, 404, 406 as described above, the interaction devices being able to connect to a guest's mobile device 200 to detect the presence of the guest.

As will be appreciated, the interaction devices may also include cameras 1000 in the hallway that could visually capture, for example, the door opening and closing and would also be able to identify whether the person opening or closing the door was a guest or a staff member.

Figure 5:
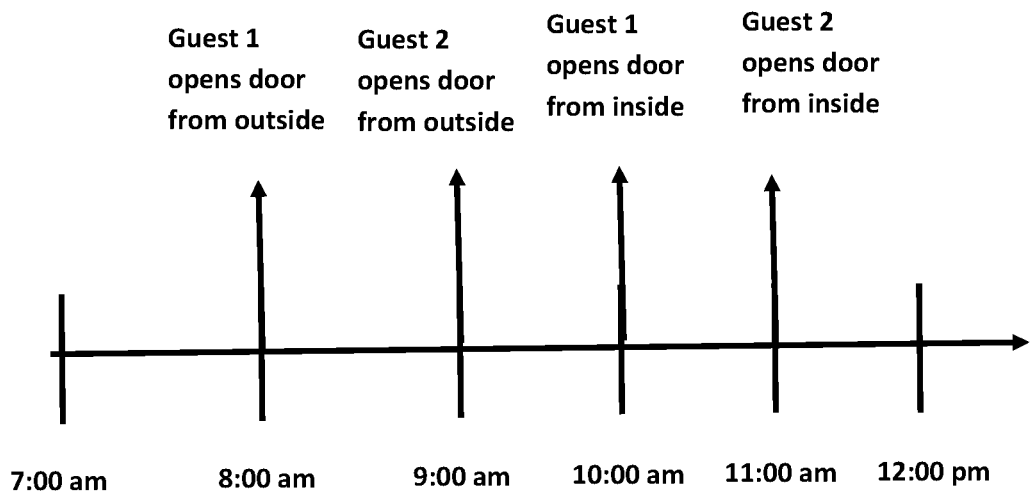
FIG. 5 is a schematic representation of door sensor activity information received by the system of FIG. 1.
Figure 6:
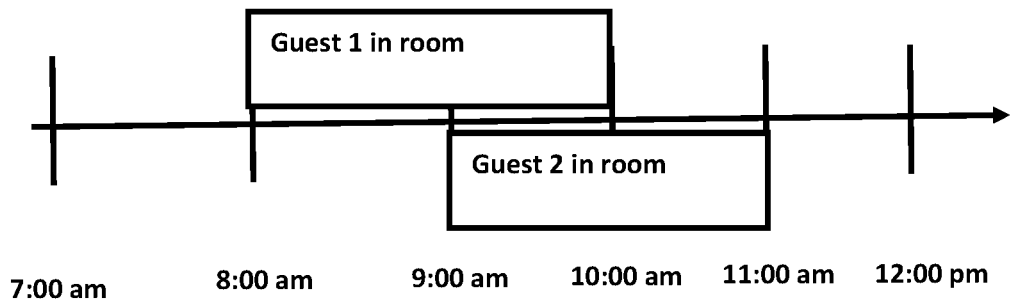
FIG. 6 is a schematic representation of interaction device activity information received by the system of FIG. 1.
Figure 7:
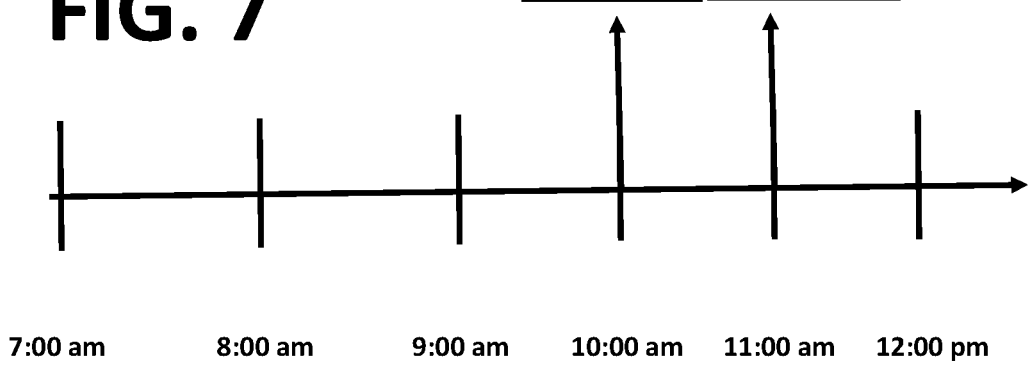
FIG. 7 is a schematic representation of a check-out determination made by the system of FIG. 1 based on information received as shown in FIGS. 5 and 6.

In one embodiment, with reference also to FIGS. 5 and 6, a first door sensor 702 may be triggered when Guest 1 enters a first room 802, for example, at 8:00 am, and the first interaction device 402 may detect the presence of Guest 1 in the first room 802 via the first interaction device 402 being connected to the first guest's mobile device 202. Additionally, a second door sensor 706 may be triggered when Guest 2 enters a second room 806, for example at 9:00 am, and the second interaction device 406 may detect the presence of Guest 2 in the second room 806 via the interaction device 406 being connected to the second guest's mobile device 206. The first and second door sensors 702, 706 may communicate the unlocking and opening of the respective doors from the outside at their respective times to the server 300 as indicated in FIG. 5. Therefore, the system 100 could infer that Guest 1 entered the first room 802 at 8:00 am and that Guest 2 entered the second room 804 at 9:00 am. By cross-referencing other information, such as the guest information database 600, the system could further confirm that Guest 1 has been assigned to the first room 802 and that Guest 2 has been assigned to the second room 804.

Further, as shown in FIG. 6, each guest's mobile device 202, 206 may communicate to the server 300 via its respective communication module 220 that such mobile device 202, 206 is connected to a respective interaction device 402, 406 while the guest is in each respective room 802, 806. Therefore, the system 100 could infer that Guest 1 and Guest 2 were in their respective rooms while their respective mobile devices 202, 206 were connected to each respective interaction device 402, 406. Further, the system could further determine that Guest 1 and Guest 2 remained in their rooms during a particular period of time if no further opening or closing information of the doors was relayed by the respective door sensors 702, 706 to the server 300.

Additionally, the first door sensor 702 may be triggered again when Guest 1 leaves the first room 802, for example, at 10:00 am, such that the first door sensor 702 could communicate the opening of the door from the inside to the server 300. Further, the interaction device 402 may become disconnected from Guest 1's mobile device 202 once Guest 1 has walked far enough away from such interaction device 402. As such, the system 100 could infer from the lack of detection of Guest 1's mobile device 202 with respect to interaction device 402 that Guest 1 is no longer in the first room 802. Further, the system could further determine that Guest 1 has left the first room 802 having received information from the first door sensor 702 relating to the door opening from the inside. Similarly, the second door sensor 706 may communicate to the server 300 Guest 2 opening the door from inside the second room 806 at, for example, 11:00 am and the system 100 could assume that Guest 2 is no longer in the second room 806 once Guest 2's mobile device 206 does not relay any signal strength information from interaction device 406 to the system.

Based on at least the information provided by the door sensors 702, 706, the interaction devices 402, 406, and the mobile devices 202, 206, the system 100 could correlate the door opening events and the interaction devices connection and disconnection events to make a determination about whether Guest 1 and/or Guest 2 has "checked-out" of their room, i.e., left their room for the last time on their trip to not return. As will be appreciated, the system could also cross-reference information located in the guest activity database 900 to determine the intended check-out dates for Guest 1 and Guest 2.

In one embodiment, the system 100 is configured to take into account further information in the form of historical data as described below in order to accurately predict that the guests have intended to check-out. For example, in one embodiment, the system 100 could analyze information provided by additional interaction devices 400 throughout the property, such as particularly the detection of the guests' mobile devices 202, 206 or the visual detection by cameras proximate to any interaction devices located near exits or the valet stand of the property, that the guests have intended to check out.

As described above, the system may be configured to use particular information received from a number of guest mobile devices and/or cameras as described here to "learn" about guest check-out behavior habits to make a determination that a guest has checked-out.

In one embodiment, such information could relate to or be based on one particular guest's habits, a group of guests' habits (such as a number of guests attending a local conference, wedding, or other event), or all guests' habits generalized after receiving a sufficient amount of data.

With respect to particular groups that may be large enough to provide meaningful data, the system may be configured to identify members of such groups either explicitly via information provided to the system, such as an XYZ Conference Attendee, or the system may gradually learn information about particular groups of people organically over time, such as that guests who use the gym facilities may typically order a juice from the juice bar after they work out.

In one embodiment, the property may be hosting an XYZ conference or may be proximate to the conference such that a large number of conference attendees are staying at the property. Accordingly, the system may be configured to make predictions about a known conference attendee that it may not apply to a non-conference attendee guest.

For example, if Person A, a conference attendee, is walking down a hallway that connects to and is proximate to the conference room area of the property, the system may predict that the person is attempting to check in for the conference and may automatically offer to confirm the attendee's conference registration and may also offer information about where to pick up any conference-provided materials and other information about the conference. On the other hand, if Person B, not a conference attendee is walking down the same hallway, the system may not offer any conference-related information, but rather may offer other information (or no information) depending on any relevant predictions determined by the system.

In another embodiment, the system may be able to determine that a particular subset of the general guest population of the property exhibits certain characteristics from which it may be able to determine a predictive trend. For example, the system may be able to determine over time that guests that play the high-limit games and/or slot machines may also tend to dine at the higher-end restaurants on the property and therefore, the system may be configured to offer a promotion for a higher-end restaurant to such a guest that it may not necessarily offer to other guests. It will be appreciated that the above examples as well as the ones that are included below are only a few of the scenarios of which the system can predict guest actions or destinations.

To continue with the above example, based on correlating historical information about guests' intended stays, including their check-out date and mandatory check-out time, to respective historical guest room door data, the system 100 may learn that guests that leave their room on their intended check out date before their mandatory check out time most often do not return to their room, or if they do return, they stay for only a short period of time. The system may further learn, for example, that guests who leave their room closer to their mandatory check-out time return to their room even less often than those guests that leave their room hours before their mandatory check-out time. Accordingly, the system could make a determination of the likelihood that the guest had left their room intending to check out based on historical data relating to a number of factors, as described above.

In a further embodiment, the system could further evaluate its prediction of check-out or no check-out based on that guest's encounters with further interaction devices 400 as the guest travels through the property and compare the current guest's encounters with the historical data. As such, the system may arrive at different confidence levels of its prediction based on whether the guest proceeds toward an exit of the property or towards another portion of the property.

In one embodiment, the data in the system 100 will be tagged with metadata allowing correlations to be made to improve the guest experience and to optimize revenue for the property.

In the above example relating to FIGS. 4-7, once the system 100 makes a determination that the guests have checked out, the system could initiate via the workflow initiation module 340 any relevant business workflows associated with the guest check-out including servicing the room, notifying a valet service that the guest may be needing their vehicle or a ride to the airport, and notifying a future guest about the availability of their room, among others.

Figure 8:
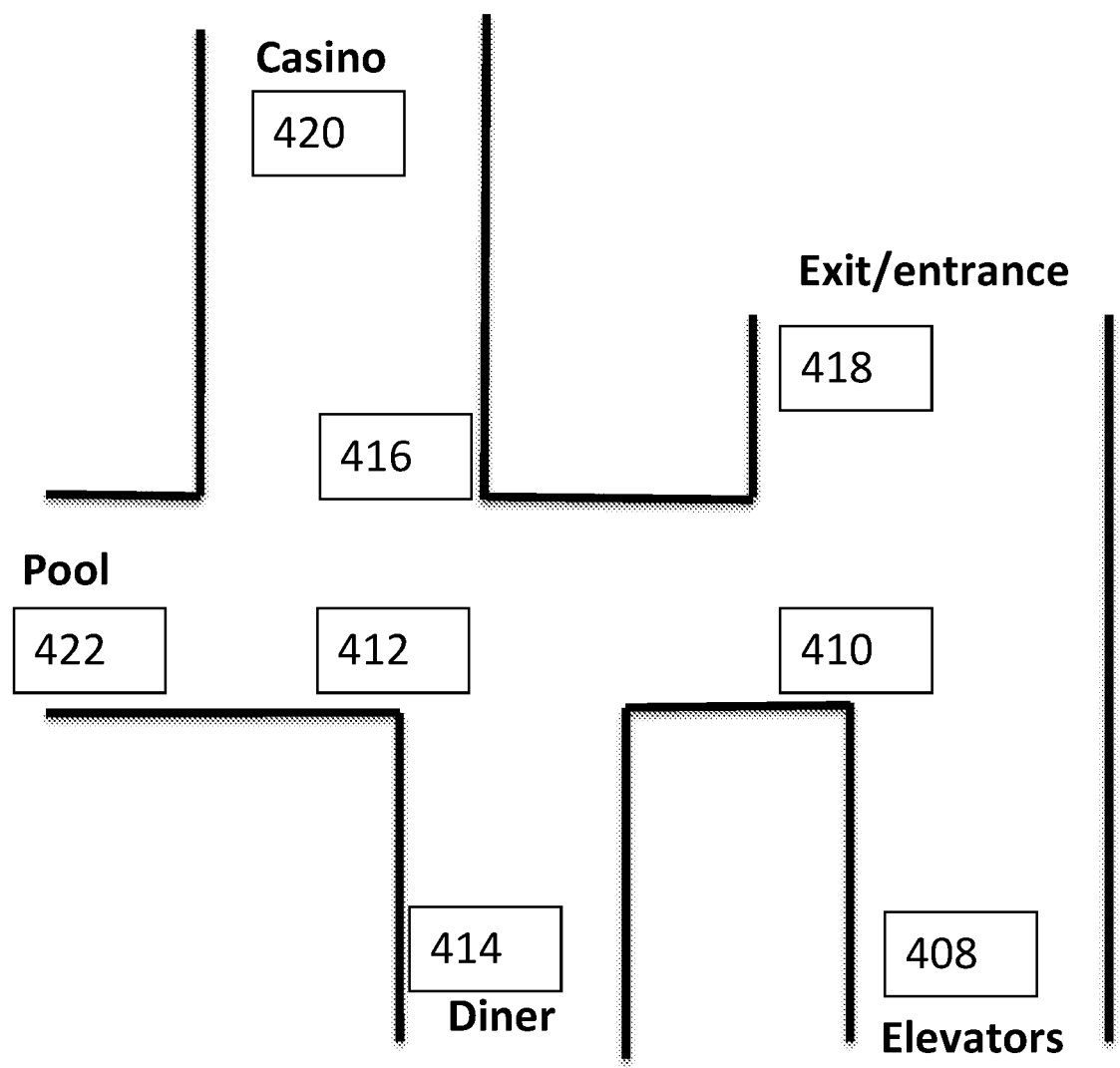
FIG. 8 is a schematic representation of a property layout having interaction devices located in various places on the property.

Another exemplary embodiment of the system 100 is shown in FIG. 8. With reference to the figure, there are a number of interaction devices 408-422 placed in various locations throughout an area of the property. As will be appreciated, the shown arrangement of interaction devices is merely an example and more or fewer interaction devices may be distributed around the property in any of a number of different configurations. Further, these interaction devices could be a combination of interaction devices intended to electronically communicate with a user's mobile phone as well as cameras.

FIG. 8 depicts a hypothetical property layout showing entrances or doorways to elevators for reaching property rooms, a diner, a casino, and an exit/entrance to the property. It will be appreciated that the system 100 could be implemented on a property having a significantly more complicated layout than what is shown in FIG. 8.

With reference to FIG. 8, a plurality of interaction devices 400, including cameras, may be located near various doorways and entrances and here includes interaction device 408 near the elevators, interaction device 414 near the diner entrance, interaction device 418 near the resort entrance/exit, interaction device 420 near the casino entrance, and interaction device 422 near the pool entrance. Further, there are interaction devices 410, 412, and 416 located along the hallways of the property.

Accordingly, based on the arrangement of the interaction devices in FIG. 8, the system 100 can use information detected by and communicated to each interaction device by a guest's mobile phone and/or by visual images to develop a database library of routes and interactions demonstrated by guests over time. As described below, based on being able to assess the guests' historical data, the system 100 could accurately predict to a reasonable degree of certainty what particular guest movements, routes, or actions may likely mean, and the system can use this information to make decisions about initiating business workflows relating to the system's predictions, or alternatively, to determine that no action can be taken because the system's confidence level is not high enough.

With reference to FIG. 8, for example, the system 100 may receive information about guests walking away from the elevator via guests' mobile devices that connect and disconnect to various interaction devices or whose signal is strengthening or weakening with respect to an interaction device they may be approaching or moving away from. For example, a guest's mobile device may be connected to and may be generating a strong signal to interaction device 408 as the guest exits the elevator. As the guest walks down the hallway, the signal will weaken with respect to interaction device 408 and connect to and strengthen with respect to interaction device 410, ultimately disconnecting from interaction device 408. As the guest continues moving, the system 100 may then receive further information that the guest has either turned the hallway corner based on that guest's mobile phone device information provided to the system by interaction device 412 and/or 416 or that the guest has continued walking along the hallway without turning based on information provided by information from interaction device 418.

As will be appreciated, if some or all of the interaction devices were cameras, the cameras could capture digital images or footage of guests as they pass each camera and the camera could communicate the footage to the server 300.

It will also be appreciated that, similarly, the system 100 could obtain further location information about guests' travel from the elevators 408 to the diner based on information received from interaction device 414, to the casino based on information received from interaction device 420, or to the pool based on information received from interaction device 422. Accordingly, by collecting and storing data received from guests' cell phones or from visual footage from cameras over time, the system could accumulate information regarding how often guests travel from the elevators to any one of the resort exit/entrance, the diner, the casino, or the pool.

Tracking and recording information about guests moving from the elevators to other destinations within the property is only a small fraction of the information that can be acquired by the system 100. The system 100, in the example of FIG. 8, would also be able to determine what percentage of guests went from the casino to the exit, the diner to the elevators, and so on. Further, not only would the system 100 be able to determine the percentages of guests' destinations and their routes of travel to arrive there, but also at what times the highest amount of activity occurred in each direction or along a particular route. As the system 100 gathers more guest movement information, the system may be configured to use the collected information to deduce patterns emerging from the information and to accurately predict a guest's destination such that certain business work flows could be initiated by the system without any proactive action by the guest or by any staff member.

In addition to the guest movement information that is provided to the system 100 via guests' mobile devices, the system is able to obtain other information about guests as described herein, such as the guests' check-in and check-out dates, if the guests are on the property as part of a conference or other group activity, and information about activities the guests engaged in if they previously stayed at the property. As such, the system 100 could use this information to make more informed predictions about future guest behavior.

With continued reference to FIG. 8, in one exemplary embodiment, the system 100 can accurately predict when a guest has checked out without the guest or a staff member taking any proactive action. For example, the system 100 may acquire data over a period of time such that the system can determine that guests departing the elevator go toward the exit 25% of the time, go toward the diner 15% of the time, go toward the casino 40% of time, and go toward the pool 20% of the time. Additionally, the system 100 may be able to determine that of the 25% of the time that guests move from the elevator to the property exit, they return to the property 95% of the time. Based on these percentages alone, the system 100 may not be able to predict a guest's behavior with a high enough degree of confidence to initiate any business workflows.

However, based on the collected information, the system 100 may be able to determine that certain scenarios may lend themselves to meeting a minimum accuracy threshold such that the system can initiate a business workflow based on the minimum threshold being met. For example, if the system 100 determines that when guests move from the elevators to the exit between the hours of 10:00 am and noon on the date of a guest's indicated check-out date, that guest returns to the property less than 1% of the time, the minimum threshold may be met and the system may accurately predict that the guest has left the property without any intention to return, i.e., that the guest has checked out of their room. Accordingly, in the above scenario when the system 100 collects information about any particular guest who travels from the elevator to the exit on the day of their check-out between 10:00 am and noon, the system would be able to accurately predict that this particular guest has "checked-out" and is not planning to return even though neither the guest nor any staff member has taken any proactive action.

Having determined that the guest scenario meets a minimum threshold for an accurate prediction, the system 100 may then initiate certain actions based on the prediction. For example, in the check-out example provided above, once the system 100 has received information that the guest has exited the property and that the guest's mobile device is no longer connected to the system, the system may either immediately, or after a predetermined period of time, initiate a business workflow based on its determination. For example, having determined that the guest has checked out of their room, the system 100 could send a notification to the housekeeping department to indicate that the guest's room is available to be serviced.

In one embodiment, the system 100 is configured to receive information about the guest from the guest information database 600 that stores data about the guest such as, for example, the guest's name, address, gender, gender identity, email, height, weight, age, social media posts, historical spend, historical visits, historical website browsing and email opening, entertainment preferences, food preferences, family connections, hobbies, employment information, arrival and departure dates and times, the method of transportation that the guest may be using (e.g., flying, driving, taking public transportation, etc.) and the arrival and departure flight times if applicable. The guest information database 600 may also include information about the number of times the guest has previously stayed at the property as well as the types of amenities on the property that the guest has previously used such as a health and wellness spa, restaurants, stores, the pool, various night clubs, and the gym, among others. Further, the guest information database 600 may include information about whether the guest is taking part in a particular convention, wedding, or other group activity that may allow the system 100 to predict the needs of the guest and the business workflows that need to be undertaken by the property to meet such needs.

In one embodiment, the guest information database 600 may be accessed by the system 100 via computer software that uses this information to curate the guest stay by comparing the information for particular guests to other guest preferences, spend, satisfaction scores, social media posts, and the like.

In the scenario described above with respect to FIGS. 4 to 7, for example, the system 100 could access the guest information database 600 to receive information about Guest 1's and Guest 2's check-out dates and therefore use that information to either further predict that the guests have likely checked out if they are leaving the property on their check-out day or that the guests have likely not checked out if the guests are not leaving the property on their check-out day. Further, for example, the system 100 could access the guest information database 600 to identify whether their vehicle has been parked by the property's valet service, and if so, notify the valet service that the guest will need their vehicle shortly, or whether the guest may have parked in a self-park lot, and if so, remind the guest of their parking space number.

In one embodiment, the guest can download an application 240 to the guest's mobile device 200 that allows the guest to interact with various interaction devices 400 related to the property. The guest could, for example, provide basic information (e.g., their name and an email address or phone number) and log into the application. By logging into the application, the guest could provide the system 100 to access particular information about the guest's visit, such as arrival dates and times, among other information discussed above which the system 100 could automatically retrieve from the guest information database. Further, the guest could consent to the application accessing other personal information about the guest, such as their social media accounts, internet browsing habits, and the like, so that the system could make more tailored recommendations to the guest and may be able to more accurately predict the guest's activities.

In one embodiment, the guest can use the application 240 on their mobile device 200 to choose their room from a list of rooms offered by the system 100 based on reservation information obtained from the guest information database or from other sources of input. Each room listing may be accompanied by certain information about the room including images of the room, images of the view from the room, the room's price, amenities and features of the room, among other details. The application 240 may also list rooms that could be a room upgrade for the guest and also offer discounts to the upgraded room.

If the guest does not choose a room, the application 240 may be configured to automatically assign the guest a room. Accordingly, the system 100 could be configured to associate a particular guest with a particular room and could be configured to initiate business workflows when the guest selects their room, such as notifying the guest with a welcome message, notifying the bell stand as to where the guest's luggage should be delivered, and automatically setting a room temperature to a temperature selected by the guest or to a standard room temperature preferred by a majority of guests as determined by the system.

In one embodiment, the system 100 may be configured to operate in conjunction with and receive input from digital keys or other electronic mechanisms that can be used to unlock room doors or to otherwise allow a guest to obtain access to areas of the property. In one embodiment, the system 100 may be configured to send one digital key to the guest on file as soon as the guest selects their room; typically the day of arrival. In one embodiment, guests can send digital keys to their families and friends and the number of keys assignable by the guest may be controlled by the system 100 and may be configured to allow an increase or decrease in the number of assignable keys and to void all of the keys if necessary.

Additionally, in one embodiment, the guest who made the reservation has the ability to manage keys at any time via the application, including turning on and off the ability of the digital key to obtain access to some or all areas.

As noted above, the system 100 may be configured to obtain information based on where and when a guest uses their digital key to initiate certain business workflows, for example, automatically turning on a light in a room when a guest enters, automatically turning off a light when the guest leaves, notifying a staff member to prepare a towel for the guest if they have entered a swimming area or a gym, and the like. As with other examples, the system 100 may be configured to learn about guest behavior patterns associated with the use of their digital keys as well as with other information collected by the system such that the system could predict a guest's intended location or interaction and could initiate business workflows more efficiently, more timely, and without the guest necessarily having taken any proactive steps other than using their digital key.

Additionally, in one embodiment, the guest may be able to upload a photograph or another form of digital identification of themselves which allows the system 100 to be able to identify the guest from their likeness. As such, the system 100 may be able to recognize the guest based on their physical appearance and the guest may be able to use their digital identification to perform various actions on the property and to access various features and amenities on the property. For example, the guest may use their digital identification to open suite doors, access the pool, access express lanes to night clubs and other food and beverage locations, pay for purchases, etc. Additionally, a guest's digital identification could be used to confirm that the guest's payment method matches the name on the reservation and such connection can be made as soon as the reservation is made or as late as arriving on the property.

In one embodiment, the system 100 may be able to recognize a guest by their physical appearance, such as their facial appearance. Accordingly, if the system 100 receives information from an interaction device 400 that the guest has entered a particular restaurant on the property, the system may be configured to automatically offer to display the restaurant's menu on the guest's phone. In one embodiment, based on information provided to the system from various interaction devices 400, for example, interaction devices located in a hallway leading up to the restaurant, the system 100 may be able to predict that the guest is intending to dine at the restaurant before the guest actually arrives at the restaurant and may offer the menu to the guest while the guest is approaching the restaurant.

In one embodiment, the system 100 may be configured to allow the guest to order their meal and/or drinks directly from their phone via an application. Further, in another embodiment, the system may recognize that this particular guest has ordered the same menu items the last three times they have dined in the restaurant and therefore the system 100 may automatically offer the guest those particular menu items or related menu items at the top of the menu in addition to the rest of the menu being located farther below the initial offerings.

In one embodiment, after the guest has finished their meal, the system 100 may be configured to identify via an interaction device 400 that the guest has left the restaurant and may be configured to charge the guest automatically or place the restaurant charges on the guest's room tab without the guest taking any affirmative actions such as requesting the check, taking out their credit card, or signing the check.

Additionally, in one embodiment, when the system 100 determines that the guest has left the restaurant, the system may provide a notification to the staff that the guest's table is now vacant and that various workflows can be initiated such as cleaning the table and offering it to the next guest.

In one embodiment, the system 100 will learn a guest's appearance, features, and habits over time and recognize them not only using their face but also their posture, height, body silhouette, their skeletal bend points, how they hold their digital device, how they swipe on an app, the size of their finger, the pressure they use while selecting app menus, and the like. For example, as the guest interacts with the phone, the phone can capture angles of grip, size of finger, left- or right-hand preferences, time of use, duration of use, and the like. Additionally, while cameras can be used to recognize a face, if the facial recognition confidence is low, the system could also estimate a guest's height, weight and posture as well as other information it can obtain about the guest to help the system 100 identify the guest.

In one embodiment, the system 100 may be configured to allow room entry via facial recognition for anyone on the guest list for a particular reservation. In one embodiment, guests who may want to use facial recognition can add their photo to the reservation by sending it to the reservation holders' device or when access is granted by the reservation holder.

As with other examples, the system 100 may be configured to learn about guest behavior patterns associated with the use of their physical appearance to interact with the property as well as with other information collected by the system such that the system could predict a guest's intended location or next interaction and could initiate business workflows more efficiently, more timely, and without the guest necessarily having taken any proactive steps other than using their physical appearance to interact with interaction devices 400 on the property.

In one embodiment, the system 100 may be configured to control room environmental settings that will be automatically set based on the guest's preferences that could be received by or learned by the system 100. In one embodiment, the guest could directly input preferences into the application in order to control various room conditions such as temperature, lighting, audio, video, etc.

If the guest does not set preferences, the system 100 can use a guest's historical behavior to suggest settings. For example, if the guest usually sets the temperature in the room to a particular setting, the system 100 could anticipate the particular setting and automatically set the temperature when the system 100 anticipates that the guest is going to the room or when the guest is in the room.

In another embodiment, the system 100 can be configured to assess historical data associated with guest behavior at the property to automatically set room environmental settings. For example, the system 100 may determine that a majority of guests of the property set the temperature of their room to 68 degrees Fahrenheit at night during the summer months and set the temperature of their room to 72 degrees Fahrenheit at night during the winter months and the system may be configured to automatically adjust the temperature in a guest's room to the appropriate temperature depending on the time of year and the time of day.

In one embodiment, the system 100 may be configured to provide and receive information about guest purchases on the property and to process payments for such purchases automatically without the guest taking any affirmative steps other than initially providing and authorizing a payment mechanism to the system 100. In various embodiments, the guest could set up their account on the application to include, for example, a digital wallet, credit or debit card information, or bank account information such that payments could be made automatically from the guest's account.

For example, if the guest is eating at a restaurant on the property, the guest could activate a menu by pointing the camera of their device at a Quick Response (QR) code located on the table or in another convenient location within the restaurant. Further, the guest may be able to place their order via an application 240 on their mobile device 200. The system 100 could be configured to notify the restaurant staff that the order has been placed, wherein the order could be verified by the staff and special requests could be noted. Additionally, in one embodiment, the guest could track the progress of their order, edit their order, and/or order additional items via the application without summoning the staff.

At the end of the meal, the guest could leave the establishment without proactively paying for their meal. In this case, for example, based on information obtained from the guest's mobile device 200 that indicates the mobile device is not interacting with any interaction devices 400 in the restaurant and is interacting with interaction devices elsewhere on the property, the system 100 could determine that the guest has left the restaurant. As such, the system 100 can be configured to automatically bill the guest for the items purchased at the restaurant and can be configured to automatically charge a payment device the guest has set up for their account. The system 100 could also notify the guest about the ability to leave tips at any time for purchased items. Additionally, the system 100 could be configured to allow the guest to leave feedback for, in the case of a restaurant, the chef, the waitstaff or any other member of the staff. In one embodiment, the system 100 could be configured such that the guest as well as staff of the restaurant could receive a rating.

The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, and/or sections, these elements, components, regions, and/or sections should not be limited by these terms. These terms are used to distinguish one element, component, region, or section from another element, component, region, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a) and 35 U.S.C. § 132(a).

The term "processor" or "processing circuit" is used herein to mean any combination of hardware, firmware, and software, employed to process data or digital signals. Processing circuit hardware may include, for example, radio baseband processors (BPs or BBPs), application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Various computational portions of embodiments of the present invention, including the operation of a guest activity detection system through a mobile device application, may be implemented through purpose-specific computer instructions executed by a computer system. The computer system may include one or more processors, including one or more central processing units (CPUs), one or more graphics processing units (GPUs), one or more field programmable gate arrays (FPGAs), one or more digital signal processors (DSPs), and/or one or more application specific integrated circuits (ASICs). The computer system may also include peripherals such as communications devices (e.g., network adapters, serial or parallel data bus adapters, graphics adapters) for transmitting and/or receiving data to and from other devices such as data storage systems (e.g., databases), display devices, and other computer systems. The computations may be distributed across multiple separate computer systems, some of which may be local to the users (e.g., user devices such as smartphones and personal computers) and some of which may be remote (e.g., off-site, "cloud" based computing resources connected to the user devices through a wide area network such as the Internet).

Although example embodiments of the automated guest activity detection system have been described and illustrated herein, many modifications and variations within those embodiments will be apparent to those skilled in the art. Accordingly, it is to be understood that the automated guest activity detection according to the present invention may be embodied in forms other than as described herein without departing from the spirit and scope of the present invention. The present invention is defined by the following claims and equivalents thereof.

What is claimed is:

1. A system for initiating a workflow on a resort property, the system comprising:
    a plurality of interaction devices, each of the interaction devices being configured to wirelessly connect to a mobile computing device associated with respective guests of the resort property only when the mobile computing device is within a predetermined vicinity of at least one interaction device and/or being able to capture images of a guest of the resort property when the guest is within a predetermined vicinity of at least one interaction device;
    a server being configured to obtain guest information from the plurality of interaction devices, wherein the guest information comprises a signal strength of the mobile computing device that is connected to one or more interaction devices or images of the guest, as well as a time stamp associated with the signal strength or images;
    a processor and a non-transitory computer readable medium, the non-transitory computer readable medium having computer-executable instructions stored thereon which, when executed, cause the processor to:
        obtain a series of signal strengths from the quest's mobile device as the guest's mobile phone passes by the plurality of interaction devices and a series of time stamps, each time stamp associated with a respective signal strength;
        store the series of signal strengths and associated times stamps on the server as quest information;
        dynamically generate, via a map generation module, a map of the guest's travel path as the guest moves on the resort property, the map being based on a location of each interaction device, at least one signal strength associated with each interaction device as the quest's mobile phone interacts with each interaction device, and a respective time stamp associated with each signal strength such that the dynamically-generated map is updated as the quest moves and as the guest's mobile phone interacts with each interaction device;
        evaluate the dynamically-generated map relating to the guest of the resort property against previous maps generated by the map generation module based on previous quests' travel paths on the resort property, such previous maps being generated based on a location of each interaction device, at least one signal strength associated with each interaction device as each previous guest's mobile phone interacted with each interaction device, and a respective time stamp associated with each signal strength;
        determine whether the map of the guest allows the system to make an accurate prediction of the guest's intended action or destination based on the a comparison with previous maps generated by the map generation module; and
        if the map allows an accurate prediction to be made regarding a guest's intended action or destination, initiate a workflow based on the prediction.

2. The system according to claim 1, wherein each of the interaction devices is a location device, an access point, a sensor, or a camera.

3. The system according to claim 1, wherein the guest information comprises data relating to guest travel on a route between a first and a second interaction device.

4. The system according to claim 3, wherein the prediction based on the stored historical information is based on a percentage of guests traveling on the route between the first and second interaction devices.

5. The system according to claim 4, wherein the prediction based on the stored historical information is further based on a percentage of guests traveling on the route between the first and second interaction devices during a predetermined period of the day.

6. The system according to claim 4, wherein the prediction based on the stored historical information is further based on a percentage of guests traveling on the route between the first and second interaction devices on a date identified by the system as the particular guest's check-out date.

7. The system according to claim 4, wherein when the prediction is higher than a predetermined threshold, the system is configured initiate a workflow based on the prediction.

8. The system according to claim 3, wherein when the prediction related to guests traveling on the route between the two interaction devices during a predetermined period of a day is higher than 95%, the system is configured to initiate a workflow based on the prediction.

9. The system of claim 1, wherein the system is configured to compare the historical information with obtained guest information relating to the particular guest to predict the particular guest's intended action or location.

10. The system of claim 1, wherein the workflow comprises at least one of the following activities of checking out a guest, checking in a guest, indicating that a guest room is ready to be serviced by housekeeping, notifying housekeeping that a guest room is ready to be serviced, issuing a key, retrieving a guest's vehicle, delivering a guest's luggage to their room, and setting a thermostat in a room to a particular temperature.

11. The system according to claim 1, wherein one of the interaction devices is a door sensor configured to provide a door sensor notification to the system when a door associated with the door sensor is either opened or closed.

12. The system according claim 11, wherein the prediction associated with the obtained information comprises the door sensor notification from the door sensor associated with a respective door.

13. The system according to claim 12, wherein when the prediction includes information relating to the door sensor notification from the door sensor associated with a respective door such that the prediction of a particular intended action or location is higher than a predetermined threshold for a predetermined time period, the system is configured to initiate a workflow based on the prediction.

14. A system for automatically checking out a guest of a resort property, the system comprising:
    a plurality of interaction devices including an interaction device proximate to an exit of the resort property, each of the interaction devices configured to electronically obtain guest information from guests of the resort property;
    a server in electronic communication with the interaction devices and configured to electronically obtain the guest information from the plurality of interaction devices, wherein the guest information comprises a signal strength of the mobile computing device that is connected to one or more interaction devices or images of the guest as well as a time stamp associated with the signal strength or images;

a processor and a non-transitory computer readable medium, the non-transitory computer readable medium having computer-executable instructions stored thereon which, when executed, cause the processor to:

obtain a series of signal strengths from the quest's mobile device as the guest's mobile phone passes by the plurality of interaction devices and a series of time stamps, each time stamp associated with a respective signal strength;

store the series of signal strengths and associated times stamps on the server as quest information;

store the guest information on the server;

obtain the quest's checkout date and store the quest's checkout date on the server;

dynamically generate, via a map generation module, a map of the quest's travel path as the quest moves on the resort property, the map being based on a location of each interaction device, at least one signal strength associated with each interaction device as the quest's mobile phone interacts with each interaction device, and a respective time stamp associated with each signal strength such that the map is updated when the guest's mobile phone interacts with each interaction device;

evaluate the dynamically-generated map relating to the guest of the resort property against previous maps generated by the map generation module based on previous guests' travel paths on the resort property including previous guests' interaction with the interaction device located proximate to the exit of the resort property, such previous maps being generated based on a location of each interaction device, at least one signal strength of a previous quest's mobile phone associated with each interaction device, and a respective time stamp associated with each previous quest's signal strength such that an order of when the previous guest's mobile phone passed by each interaction device was determined;

determine, based on information stored in the server, whether a current date is the guest's check-out date;

predict based on the previous maps generated by the map generation module whether the likelihood that the guest intended to check out is higher than a predetermined threshold;

if, upon predicting that the likelihood that the guest is checking out is higher than the predetermined threshold, automatically checking out the guest.

15. The system according to claim 14, wherein each of the interaction devices is a location device, an access point, a camera, or a sensor.

16. The system according to claim 14, wherein the instructions cause the processor to determine whether the guest's computing device is connected to any of the interaction devices on the property or whether any of the interaction devices have communicated images of the guest to the system as part of predicting whether the guest is not planning to return to the property.

17. The system according to claim 14, wherein, if the system has checked-out the guest, the instructions cause the processor to further notify housekeeping staff of the resort that the guest's room is ready to be serviced.

18. The system according to claim 14, wherein one of the interaction devices is a door sensor configured to provide a door sensor notification to the system when a door associated with the door sensor is either opened or closed.

19. The system according to claim 18, wherein the instructions cause the processor to determine whether a door of the guest's room has been opened within a predetermined amount of time based on the door sensor notification to the system regarding the opening of that door.

20. The system according to claim 14, wherein to evaluate whether the guest has traveled past the first interaction device, the system evaluates whether the guest's mobile computing device has been recently connected to the first interaction device and whether the guest's mobile computing device was disconnected from the first interaction device after having been recently connected to it.

21. The system according to claim 14, wherein the prediction based on previous guests' behavior relating to traveling past the first interaction device comprises evaluating information obtained from a plurality of guests' mobile computing devices being connected to and disconnected from the first interaction device over a predetermined period of time.

22. The system according to claim 14, wherein automatically checking out the guest does not require any proactive action taken by the guest or by any staff of the property.

\* \* \* \* \*

UNITED STATES PATENT AND TRADEMARK OFFICE
CERTIFICATE OF CORRECTION

PATENT NO. : 12,124,983 B2
APPLICATION NO. : 17/463029
DATED : October 22, 2024
INVENTOR(S) : Matthew Perkins et al.

It is certified that error appears in the above-identified patent and that said Letters Patent is hereby corrected as shown below:

In the Claims

In Column 27, Line 32, in Claim 1, delete "quest's" and insert -- guest's --.

In Column 27, Line 38, in Claim 1, delete "quest" and insert -- guest --.

In Column 27, Line 44, in Claim 1, delete "quest's" and insert -- guest's --.

In Column 27, Line 47, in Claim 1, delete "quest" and insert -- guest --.

In Column 27, Line 53, in Claim 1, delete "quests'" and insert -- guests' --.

In Column 27, Line 62, in Claim 1, after "the" delete "a".

In Column 28, Line 47, in Claim 12, after "according" insert -- to --.

In Column 29, Line 10, in Claim 14, delete "quest's" and insert -- guest's --.

In Column 29, Line 17, in Claim 14, delete "quest" and insert -- guest --.

In Column 29, Line 19, in Claim 14, delete "quest's" and insert -- guest's --.

In Column 29, Line 19, in Claim 14, delete "quest's" and insert -- guest's --.

In Column 29, Line 22, in Claim 14, delete "quest's" and insert -- guest's --.

In Column 29, Line 22, in Claim 14, delete "quest" and insert -- guest --.

In Column 29, Line 26, in Claim 14, delete "quest's" and insert -- guest's --.

Signed and Sealed this
Twenty-fifth Day of February, 2025

Coke Morgan Stewart
*Acting Director of the United States Patent and Trademark Office*

CERTIFICATE OF CORRECTION (continued)
U.S. Pat. No. 12,124,983 B2

In Column 29, Line 40, in Claim 14, delete "quest's" and insert -- guest's --.

In Column 29, Line 43, in Claim 14, delete "quest's" and insert -- guest's --.